Feb. 8, 1944.　　　　G. M. BUEHRIG　　　　2,341,176
MODELING TABLE
Filed Feb. 10, 1940　　　2 Sheets-Sheet 1

INVENTOR
Gordon M. Buehrig.
BY John P. Tarlos
ATTORNEY

Feb. 8, 1944. G. M. BUEHRIG 2,341,176
MODELING TABLE
Filed Feb. 10, 1940 2 Sheets-Sheet 2
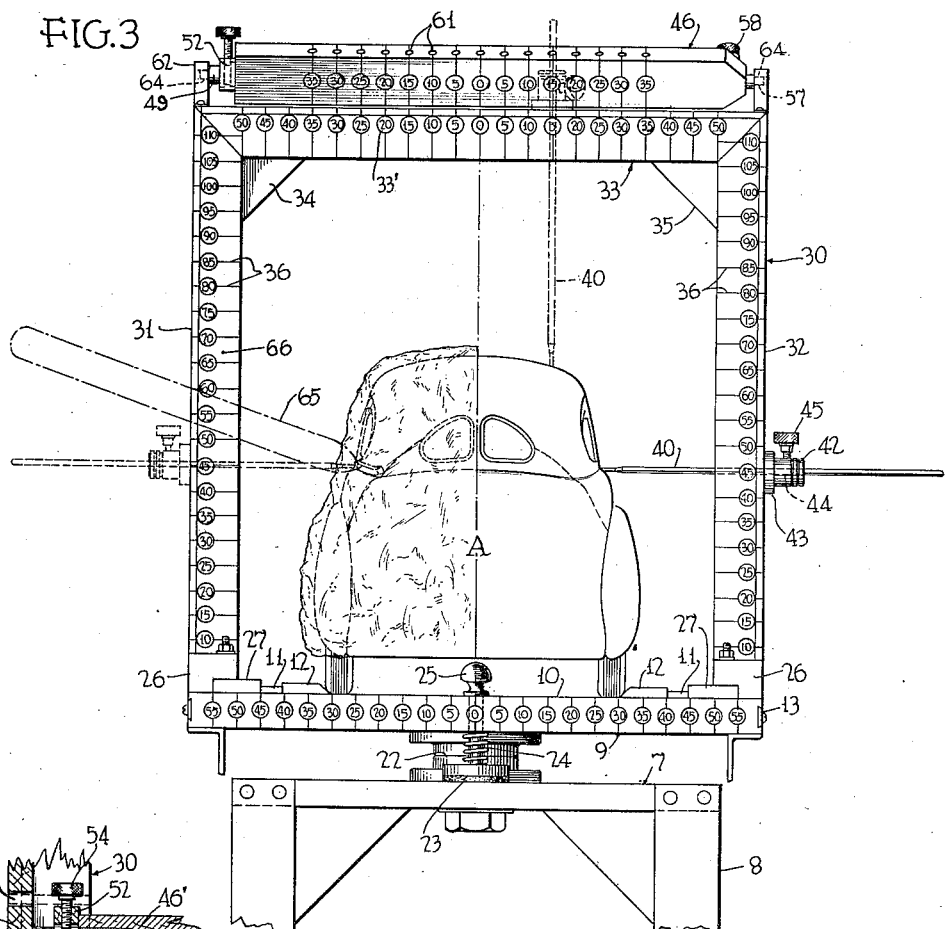
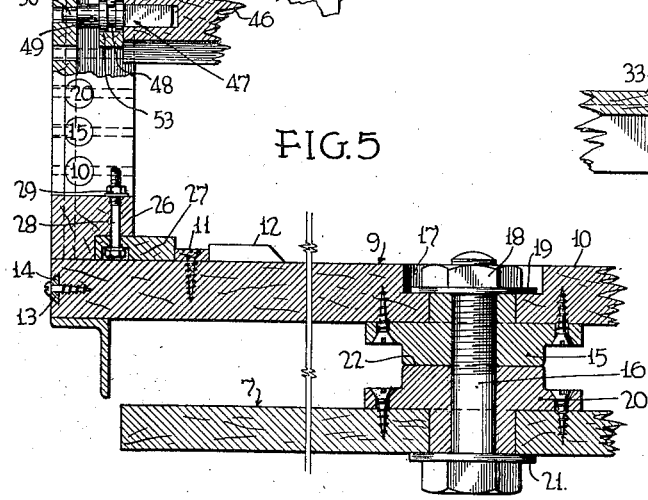
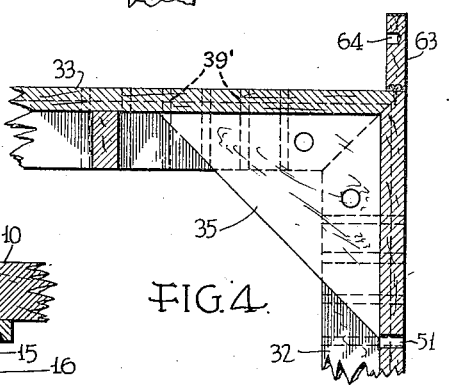
INVENTOR
Gordon M. Buehrig.
BY John P. Tarbox
ATTORNEY Patented Feb. 8, 1944

2,341,176

UNITED STATES PATENT OFFICE 2,341,176

MODELING TABLE

Gordon M. Buehrig, Auburn, Ind., assignor to Edward G. Budd Manufacturing Company, Philadelphia, Pa., a corporation of Pennsylvania Application February 10, 1940, Serial No. 318,225

14 Claims. (Cl. 41—25)

This invention relates in general to modeling devices, having for its general object the provision of an improved method and means adapted and designed to facilitate the shaping of a model to a desired configuration.

A more particular object is the provision of a modeling table having means for determining contour measurements and points on the various surfaces of a plastic model preparatory to removing material therefrom on either side of a plane of symmetry.

Another object is to provide an improved modeling table adapted to conveniently permit the accurate positioning of points on a three dimensional model preparatory to the establishing of contour lines thereon for subsequent transfer to or projection on a two-dimensional body on a different or full scale.

A further object is the provision of a method and means whereby a model, after being shaped on one side to a desired contour, may be accurately configured to a symmetrical contour on the opposite side.

With these and other objects not specifically referred to, the invention consists in certain novel parts, arrangements, operations and combinations which will be described in connection with the accompanying drawings wherein:

Figure 3 is an end elevational view of the device operatively employed in transferring points from the righthand completed side of the model to the left unfinished side preparatory to removing material from the last-mentioned side;

Figure 4 is a fragmentary, enlarged, vertical sectional view showing the construction of the upper right-hand corner of the turntable bridge; and Figure 5 is a fragmentary, enlarged, vertical sectional view showing details of construction of the turntable and the supporting stand.

Figure 1:
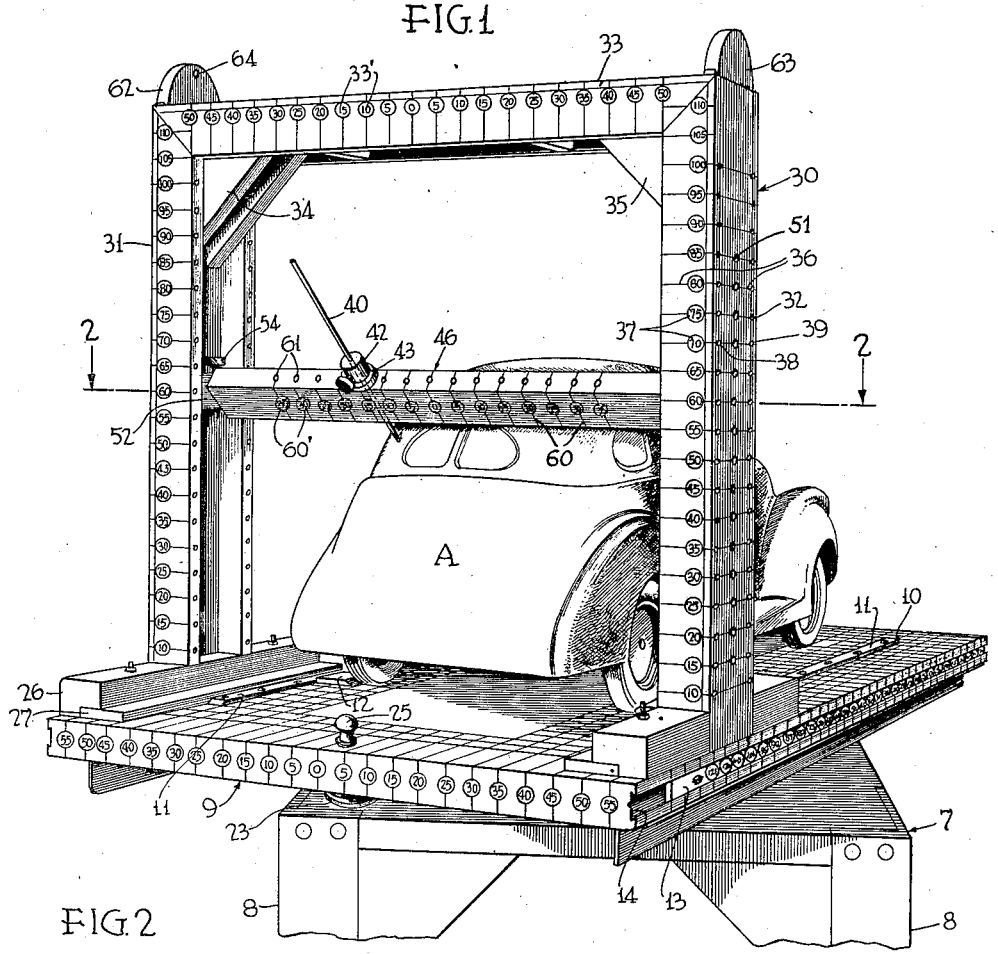
Figure 1 is a perspective view of an embodiment of the invention operatively employed in locating points on one of the surfaces of a three-dimensional model approaching a finished condition.

The present invention, although particularly directed to the production of contour models such as those customarily used in the automotive industry, may be employed in any field where a model of desired configuration of an article, in full scale or on a different scale, is ordinarily prepared.

In preparing a wax or plastic model, for example, of a vehicle, after a certain amount of material has been removed and the model has assumed roughly more or less of the general contour desired; one side of it is brought to a finished condition by the paring or otherwise removing of material therefrom. This finished condition is shown on the right-hand side of the model as depicted in Figure 3, the superfluous material on the other side of the longitudinal vertical plane of symmetry being appropriately illustrated in the same figure. By projecting the probe rod into the left side of the wax model, as indicated in dotted lines in Figure 3, to a point symmetrical with respect to the point located on the righthand side of the model by the probe rod as illustrated in full lines, relatively to the plane of symmetry mentioned above, it will be apparent that the depth of cut or amount of material to be removed from any given point or position for the attainment of a correct contour on both sides of an object may be readily determined.

As described hereinafter, the present method and means permits the production of a plastic model in accurate contour while facilitating the several steps required in arriving at the finished article.

For the purpose of illustrating the invention I have shown one form thereof which is at present preferred, since the same has been found to be convenient, practical and serviceable; but it is to be understood that the various instrumentalities comprising the invention can be variously arranged and organized, and that the invention is not limited to the precise arrangement and organization of the instrumentalities as herein shown and described.

Referring now to the drawings wherein similar characters of reference indicate corresponding parts in the several views of the preferred form of the invention, the numeral 7 designates a table or stand having supporting legs or standards 8.

Rotatably mounted on the stand 7 is a turntable designated generally at 9 and comprising a top 10 on which the model A is placed. Laterally extending strips or guides 11 fastened to the top 10, and cleats or abutments 12 slidable on the said top, aid in positioning the bridge member and in locating the model A for subsequent manipulation.

A strip having a calibrated scale on an outer face thereof, as at 13, is removably mounted in a groove or way 14 arranged longitudinally on two of the opposite edges of the turntable top. The removable scale 13, which may be interchanged or replaced by other scales of different calibration, as preferred, permits the ready determining of the general dimensions of the model, and its exact position relatively to other members of the top during the process of establishing points on the surface of the model, preparatory to removal of the material therefrom and for contour line transfer, as hereinafter described.

To the under part of the top 10 of the turntable, a plate 15 is fastened, the said plate having a threaded hole receiving a screw bolt 16 the upper end of which is projected through a recess 17 formed in the upper surface of the top 10. A nut 18 and washer 19 arranged on the threaded stem of the screw bolt 16 serve to removably secure the table top to the stand 7, as described elsewhere.

Juxtaposed against the lower face of the upper plate 15 is a similar plate 20 fastened to the top of the stand 7, and provided with a hole accommodating the unthreaded portion of the screw bolt 16 and registering with the hole in the upper plate 15. The head of the screw bolt 16 normally engages a washer 21 abutting the underneath surface of the stand 7. By inspection of Figure 5, it will be seen that the juxtaposed surfaces of the plates 15 and 20 provide a bearing surface 22 permitting free angular movement of the turntable 9 relatively to the stand 7, when desired.

A brake shoe or stop 23 secured to the end of a spring rod 24 and protruded downwardly through the turntable top into biased engagement with the upper surface of the stand 7, is adapted to prevent undesired angular movement of the turntable while the model is being operated on. The spring rod 24 has a manipulating knob 25 protruding above the level of the turntable top, the said knob permitting the spring rod 24 to be raised by the operator to temporarily free the turntable for rotation in order to locate the model in the desired position. Release of the spring rod 24 by the operator returns the brake shoe 23 into engagement with the stand 7.

The turntable 9 further includes a pair of blocks or gibs 26 slidably mounted in opposed relation on the top 10 of the turntable, and having extensions or abutment members 27 fastened thereto as by the screw bolts 28 and nuts 29. The inner edges of the extensions, as best shown in Figures 1 and 3, abut the adjacent edges of their guides 11.

The bridge member, designated generally at 30, comprises the uprights 31, 32, suitably fastened to the blocks 26. The uprights 31, 32 are joined at their tops by a cross bar 33 braced to the said uprights by the triangular shaped members 34, 35, and are provided on three of their sides with similar graduation lines 36, two of the scales formed by the series of graduation lines on opposed sides of each upright having a sequence of numbers, as at 37.

On each of the graduation lines 36 between the opposed sides having the numbers 37, a pair of holes 38, 39 arranged in spaced relation is located, these holes selectively receiving the stem of a probing rod 40 of a contour or depth gauge, each pair of holes permitting the application of the latter to the model A for the determination of two points separated a predetermined distance on the same horizontal plane and without moving the adjustable bridge. The cross bar 33, similarly to the uprights 31, 32 is provided with a plurality of pairs of spaced holes (see 39' in Figure 4) each in alignment with the adjacent graduation line of a scale 33' arranged on the said cross bar. These last mentioned holes are adapted to receive the probing rod 40 in a vertical plane for application to the model as indicated in dotted lines in Figure 3, for the determination of points, similarly to the procedure described above.

The contour gauge further comprises a cylindrical body portion 42 formed with a flanged head 43, normally engaged against the outer face of one of the uprights 31, 32 as best shown in Figure 3. A passageway or bore 44 slidably receives the probing rod 40, while a thumb screw 45 threadedly engaged in the body portion 42 serves to secure the said probing rod 40 in various pre-determined positions during the establishing of points on the surface of the model.

Between the uprights 31, 32 which in cross section have a channeled configuration, an angularly and translationally movable beam or member 46 adapted to locate the probing rod 40 of the contour gauge at the desired height and angle relatively to the model, is adjustably received. One end of the member 46 is provided with a square recess 46' adapted to non-rotatably receive the square shank of an axially projecting boss or member 47 having an annular groove 48, the purpose of which will appear hereinafter. The boss 47 has a reduced portion 49 the outer end of which is normally in abutment with the wall of the adjacent upright, and is in turn reduced to provide a stud 50 adapted to be received in any of a series of holes or sockets 51 arranged in a vertical line on both the uprights.

Figure 2:
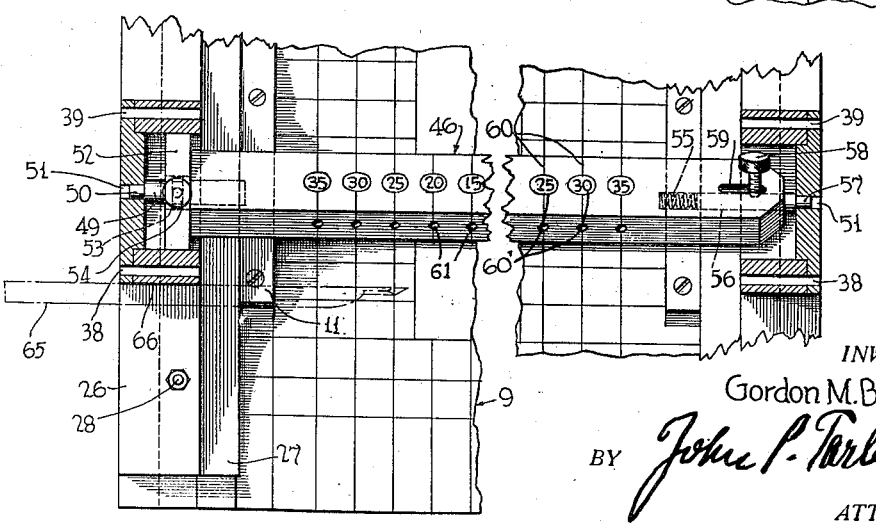
Figure 2 is a transverse sectional view taken on the line and as viewed in the direction of the arrows 2—2 of Figure 1, certain parts being shown in elevation.

As best shown in Fig. 2, a shoe 52, slidably received in the channel of the adjacent upright, is apertured as at 53 to rotatably receive the boss 47, a thumb screw 54 threadedly engaged in the said shoe 52 and protrudable into the annular groove 48, being adapted to lock the beam 46 against rotation in the desired angular position relatively to the model.

The opposite end of the beam 46 is provided with a pocket 55 slidably accommodating a spring rod 56 having a reduced end or gudgeon 57 received in the holes 51 of the uprights and normally serving to rotatably support the beam at the adjacent end. A thumb screw 58, transversely secured to the spring rod 56 and having its stem accommodated in a slot 59 arranged longitudinally in the beam, permits the retraction of the reduced end 57 from the adjacent hole 51, so that the entire beam 46 may be withdrawn by turning same about its vertical axis, after the thumbscrew 54 on the shoe 52 at the other end of the beam 46 is loosened to allow the withdrawal of the stud 50 from the adjacent hole 51, as will be readily understood by inspection of Figures 2 and 5.

The angularly and translationally adjustable beam 46, similarly to the uprights 31, 32 is provided with a series of graduation lines as at 60 arranged on three of its sides, a corresponding series of numbers 60' being applied at approximately the midpoint of the lines and forming a scale increasing in value to the right and to the left from a zero point at the center of the beam. Registering holes 61 on opposed sides of the beam 46 in alignment with the numbers 60' and the graduation lines 60 are adapted to receive the probing rod 40 of the contour gauge, as illustrated in Figure 1. It will be noted that the graduation lines on the members 33 and 46 and the numbers thereon are alike so that the zero lines of both are in one plane which coincides with the longitudinal, vertical center plane of the model indicated by a dot-and-dash line in Figure 3. Also the table 9 has graduation lines and numbers at the sides not occupied by the scales 13, which lines and numbers correspond with the lines and numbers on the cross beams 33 and 46.

As best shown in Figures 1 and 3 a pair of brackets 62, 63, each having a hole as at 64 to receive the adjacent reduced ends or gudgeons 50, 57 of the beam 46, is fastened to the tops of the uprights 31, 32 adjacent the junction of the cross beam 33. The brackets 62, 63 serve as a convenient mount for the beam 46 when the latter is not in immediate use.

The general functioning and mode of operation of the device has been in large measure indicated above, but may be summarized as follows:

A model A, formed of wax or other suitable plastic material, may be positioned in a substantially central position on the top 10 of the turntable, with its rear wheels engaging the abutments 12, and with the points of tangency of its front wheels with the table top located on a line passing through the zero line of the scale 13. The turntable is next turned to a position convenient for manipulation, after the brake shoe 23 is raised, and then locked at the desired position by the return of the brake shoe to the turntable top.

A certain amount of material may be assumed, for example, to have been removed from the right hand side of the model to bring it to a desired contour on one side of its longitudinal plane of symmetry, as indicated in Figure 3.

The probing rod 40, after the thumb screw 45 is loosened, is next inserted in one of the series of holes 38, 39 at the height desired, as for example at the point 45 on the scale of the upright 32, and then slid laterally through the body portion 42 of the gauge into contact with the right hand side of the model, as indicated in Figure 3, the flange 43 of the body portion of the gauge meanwhile abutting the adjacent side of the upright 32. The thumb screw 45 is now tightened to lock the probing rod and gauge together, after which the probing rod 40 is withdrawn and inserted in one of the holes 38, 39 on the left hand upright 31 at the corresponding height and location. The probing rod 40, as indicated in dotted lines in Figure 3, is thrust against and into the left hand side of the model until the flange 43 of the body portion of the gauge abuts the surface of the upright 31. The net result of this procedure will be the establishment of a point on the unfinished left side, symmetrical with respect to the right hand side of the model, for a purpose which will appear hereinafter.

Subsequent to the establishment of a series of points on the right hand finished side of the model and their transfer to the left hand unfinished side of same in the manner indicated, the latter side will now be engaged by a suitable paring or cutting instrument and wax material scraped therefrom to a depth equivalent to the distances of the series of points on the said left hand side of the model from the outer unfinished wax surface thereof.

The series of numbers or points on the vertical and horizontal scales on the uprights 31, 32 and the turntable top 10, may be considered as a system of rectangular coordinates wherein the various points on the horizontal scales are abscissae and the points on the vertical scales, the ordinates. In the production of a second model on a different scale from an original model, the vertical and horizontal scales above referred to, in connection with the probing rod 40, it will be apparent, afford a ready means of establishing contour points on a reduced scale model, for example, and then transferring same to an enlarged or full scale model for subsequent operation thereon.

The use of the angularly and translationally adjustable beam 46 with the probing rod 40 is practically the same as that described above in connection with the uprights 31, 32. The beam 46 is preferably positioned to project the probing rod 40 on a line normal to the adjacent surfaces of, for example, the rear end of the model, and points then established on the finished side in the manner described in connection with the method outlined above with respect to the uprights 31, 32 and the coacting probing rod 40. Since one of the functions of the device is to provide means for determining the amount of material to remove from an unfinished side of the model after the attainment of a trial or finished contour on the opposite side of the model, it will be readily appreciated that a symmetrical contour of a model may be conveniently arrived at by the method indicated.

The device is also adapted and intended for use in establishing contour lines on a reduced scale model, which has been finished to a desired configuration, preparatory to photographing same for projection on a different or full size scale; or optionally, the device may be employed in preparation for the establishment of points and for measurements which are utilized either in making templets on a different scale or in making an actual production model.

The device is further designed and adapted for use with auxiliary depth gauges which may be mounted on the table top 10 for the determination of corresponding pairs of points on either side of the plane of symmetry mentioned above.

A point, for example, located on the right-hand or finished side of the model by an auxiliary depth gauge (not shown) may be accurately transferred to a corresponding position on the left-hand or unfinished side, a scribe 65 or other suitable cutting instrument then being employed to cut or remove the material to the depth indicated.

For use in this wise, the uprights 31, 32 and the overhead cross bar 33 are provided with comparatively wide, plane surfaces, as at 66, which serve as guides or rests against which the smooth plane surface of the scribe handle is engaged, as indicated in dotted lines in Figures 2 and 3.

It is to be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herein disclosed, forms a part of the invention included in this application.

What I claim as new and desire to secure by Letters Patent is:

1. In apparatus of the kind described, the combination of a support for holding a model in a predetermined position, means movably secured to and projecting from the support on two opposite sides of the location of the model, a member connectible to the means and adjustable angularly and translationally relatively thereto, and a measurement-taking and point-determining device optionally securable to the means and to the member, whereby surface points may be established on a model and contour measurements taken of same preparatory to the contour line transfer of the said model to another model on a different scale.

2. In a modeling device of the character indicated, the combination of a table, a supporting assembly slidably adjustable on the table, a point-determining instrumentality, and means to connect the instrumentality to the assembly for angular and translational movements relatively thereto, said means including a series of holes arranged in the assembly and in a member slidably and angularly adjustable on the assembly.

3. In a modeling device of the character indicated, the combination of a point determining member, a table adapted to receive a model thereon, means on the table for locating the model and determining its general measurements thereon, a bridge assembly adjustably secured to the table and including a series of holes arranged in the assembly for accommodating said point-determining member, a holder for said member adapted to retain same in a predetermined position, and a member slidably secured to the assembly and angularly rotatable thereon for permitting the application of the said member to the model in various angular positions.

4. A device for locating and transferring points on the contour surface of a model, comprising a support, a table angularly adjustable relatively to the support, and adapted to receive a model thereon, means on the table for locating the model in the position desired and for determining its general dimensional values, a contour-engaging point-marking and transferring instrumentality, a bridge assembly slidably adjustable on the table, said bridge assembly having a plurality of apertures through which the instrumentality is protrudable into contact with a model when located on the table, and other means to support the instrumentality for movement relatively to the bridge and the table, said other means being translationally slidable and angularly adjustable with respect to the bridge.

5. In a device of the character described, a stand, a turntable rotatably mounted on the stand and adapted to operatively receive a model thereon, a bridge-like assembly having upstanding side members connected by a cross member, said assembly being slidably arranged on the table, a transverse beam removably secured to the assembly and capable of angular and translational movement relatively thereto, and a surface-engaging gauge mounted on the beam and having means to determine the relative position of contour points on one side of a model positioned on the table, preparatory to removing material from the other side of the model for the attainment of a symmetrical contour on both sides of same.

6. A modeling table of the character described for facilitating the locating and transfer of points on the contour surface of a model comprising in combination a table, a bridge-like assembly movably mounted on the table, said assembly including a pair of uprights and a cross bar, said uprights having channels slidably and removably accommodating a member angularly adjustable thereon, and means formed on said uprights, cross bar and member for operatively receiving a point-determining member.

7. A method of making a model having a plane of symmetry, which comprises providing at first the model on one side of the plane of symmetry with the desired contour while leaving its other side unfinished, thereafter completing the unfinished side of the model by transferring points from the side having the desired contour to corresponding points on the unfinished side with respect to said plane of symmetry, and then removing material from the said unfinished side to the extent indicated by the points transferred thereon.

8. The method of transferring the finished shape of one side of an object having a plane of symmetry to the other or opposite, still unfinished side, which consists in gauging the distances of a plurality of points on the object on the side with the finished shape from a plane parallel to said plane of symmetry, and subsequently determining the corresponding distances of points on the object from a plane equi-distant from but on the other side of the said plane of symmetry, and then shaping the material of the object on the said other side so that its surface corresponds to the last-mentioned distances.

9. A method of completing a plastic model having a finished contour on one side of a plane of symmetry, which consists in establishing a series of points on the said finished side, then establishing a second series of points on the unfinished side of the model which are symmetrical to the first-named series of points in relation to said plane of symmetry, and then shaping the material of the unfinished side to the extent indicated by the positions of the second series of points.

10. A method for making a model with a contour symmetrical on both sides with respect to a plane of symmetry, which consists in supporting material at a desired height and position, removing portions of said material until a rough approximation of the desired contour is obtained, finishing the model on one side to the desired contour, establishing a series of points on the finished side of the model, establishing a second series of points on the unfinished side of the model which are symmetrical to the first-named series of points relative to said plane of symmetry of the model, and finally removing portions of material from the unfinished side to the extent indicated by said second series of points so as to obtain a symmetrical contour of the model on both sides of the said plane of symmetry.

11. In a device of the character described, the combination of a support adapted for locating a model thereon in a predetermined position, means projecting from and arranged on the support, said means having plane surfaces extending transversely to the model; and a scribing instrumentality having a plane surface coactable with the said plane surfaces for engaging the periphery of the model on either side of a plane of symmetry thereof, said instrumentality being in the nature of a substantially rigid bar, said surfaces providing a comparatively wide supporting base for the scribing instrumentality and being adapted to allow the instrumentality to be held in different angular positions within the plane defined by the surfaces of said means.

12. In a device of the character described, means providing a horizontally positioned plane surface adapted for supporting a model, means normal to and arranged on the support, said means having comparatively wide plane surfaces extending transversely to the model, a point-determining instrumentality coactable with and positionable on the horizontally-positioned plane surfaces, and scribing means in the nature of a rigid bar being guided by the said wide plane surfaces for engaging the periphery of the model on either side of a plane of symmetry thereof and optionally at points determined by the point-determining instrumentality.

13. In a device of the character described, the combination of means affording a horizontally-positioned plane surface and being adapted for supporting a model in a predetermined position, a point-determining instrumentality coactable with and movably mounted on the surface, other means movably mounted on said first named means, said other means having flat plane surfaces extending substantially normally to the surface of said first named means and serving as guides, and a substantially rigid scribing bar coactable with the last mentioned surfaces and adapted to engage the model on either side of a plane of symmetry thereof, in different angular positions with respect to the surfaces of said first means and at points established by the instrumentality.

14. A device for locating and transferring points on the contour surface of a model, comprising a table adapted to receive a model thereon, means on the table for locating the model in the position desired and for determining its general dimensional values, a contour-engaging point-marking and transferring instrumentality, a bridge assembly slidably adjustable on the table, said bridge assembly having a plurality of apertures through which the instrumentality is protrudable into contact with a model when located on the table.

GORDON M. BUEHRIG.